United States Patent [19]

Clemens

[11] Patent Number: 4,903,829
[45] Date of Patent: Feb. 27, 1990

[54] CONTAINER FOR COMPACT DISC

[76] Inventor: Philip M. Clemens, 2424 Forest Park Blvd., Fort Wayne, Ind. 46805

[21] Appl. No.: 255,034

[22] Filed: Oct. 7, 1988

[51] Int. Cl.[4] .............................................. B65D 85/57
[52] U.S. Cl. ..................................... 206/310; 206/312
[58] Field of Search .............. 206/444, 309, 310, 311, 206/312, 313

[56] References Cited

U.S. PATENT DOCUMENTS

| | | | |
|---|---|---|---|
| 3,949,872 | 4/1976 | Paudras | 206/310 |
| 4,511,034 | 4/1985 | Pan | 206/310 |
| 4,519,500 | 5/1985 | Perchàk | 206/310 X |
| 4,588,321 | 5/1986 | Egly | 206/444 X |
| 4,623,062 | 11/1986 | Chàe et al. | 206/444 X |
| 4,635,792 | 1/1987 | Yamada et al. | 206/310 |
| 4,746,013 | 5/1988 | Suzuki et al. | 206/309 |
| 4,793,479 | 12/1988 | Otsuka et al. | 206/310 |
| 4,805,769 | 2/1989 | Soltis et al. | 206/309 |

FOREIGN PATENT DOCUMENTS

| | | | |
|---|---|---|---|
| 1198208 | 12/1985 | Canada | 206/309 |
| 2154550 | 9/1985 | United Kingdom | 206/311 |

*Primary Examiner*—William Price
*Attorney, Agent, or Firm*—Jeffers, Hoffman & Niewyk

[57] ABSTRACT

A container for a compact disc containing encoded musical selections is provided. The container has a base portion and a lid portion releasably connected to each other by cooperating latch elements. Annular protrusions are provided in the base portion to seat and to position the disc, and an annular ring is provided in an adjacent area of the lid portion in order to hold down the disc in the container, whereby radial and axial displacement of the disc within the container is prevented.

21 Claims, 1 Drawing Sheet

CONTAINER FOR COMPACT DISC

BACKGROUND OF THE INVENTION

The present invention relates generally to packaging containers, and more particularly, to packaging containers used to house compact discs of the type that contain encoded musical sounds or other information thereon accessible by a laser.

Disc-shaped objects have long been used for the storage and eventual playback of music and other data, however, in recent years drastic improvements have been made in the storage capability of these discs, as well as the quality of the product emanating from them. Advances in the technology pertaining to sound recording and playback equipment, as well as advances in computer and laser technology has resulted in the prevalent use of smaller discs for the storage of musical sounds than had previously been feasible. At the same time, these smaller discs are capable of storing a vast amount of encoded data. The musical sounds that are stored on these discs are reproduced on specialized laser-equipped devices in a manner that approaches absolute reproduction of the original recorded material. These "compact discs" as they have come to be known, have gained widespread acceptance in the marketplace as a result of this clear reproduction of the recorded material. In addition, the effective lifetime of these discs extends significantly beyond that of earlier recorded discs as a result of the particular computer and laser technology involved in the storage and playback of the musical sounds. Proper packaging and storing of these discs, therefore, is of utmost importance in order to protect the discs from damage in transit and display, and particularly to protect these discs during home use by the consumer. At the same time, it is desired to provide a storage container at a reasonable price that will not substantially increase the price of the disc whereby such discs would not be cost-effective when compared to alternative products available to the consumer.

In the continuing evolution of sound recording, and in particular, musical devices and players, alterations have been made to the conventional compact discs which have spawned a need for an alternate type of packaging. The conventional compact disc has a diameter of approximately 5 inches, and a capacity to store and playback a fixed amount of music. The cost to the consumer for these compact discs is based, in large part, on the amount of music stored therein, and in particular, on the number of songs included on the disc. The price for these discs may be considered unreasonably high by certain consumers. Recently an attempt has been made to reach these consumers by offering a smaller, lower-priced disc that includes fewer songs. Accordingly, the size of these newer discs has been reduced to approximately 3 inches due to the fact that less musical storage capacity is required. It is believed that consumers interested in listening to the enhanced quality of music that is emitted from compact discs, and preferring the longer and useful life of these discs, but unwilling or unable to purchase the larger discs will more readily accept the smaller version. Whereas a conventional packaging container, commonly referred to as a "jewel box" has gained nearly universal acceptance in the storage and packaging of these larger discs, price considerations diminish the desirability of this conventional container for use with the smaller discs. Although the cost of a conventional container has not been deemed unreasonably high when compared to the price of the larger 5 inch discs, the price is considered to be proportionately higher than is desirable when compared to the price of these smaller discs. The smaller discs typically sell for a price of approximately $\frac{1}{3}$ to $\frac{1}{2}$ of the price of the larger discs. Consequently, a lower-priced container is desired, yet this lower priced container must continue to adequately house the disc and protect it from damage. It is also important that this container be of sufficient durability to withstand many years of use, and that it be capable of easy opening and removal of the disc.

SUMMARY OF THE INVENTION

The present invention overcomes the problems and disadvantages associated with the prior art packaging containers of this type by providing a low-cost container that is capable of storing and protecting discs of the type described.

In general, the invention provides a container made of a semi-rigid plastic material having an interconnected base portion and lid portion. An annular post projects upwardly from the inner surface of the base, and the disc is located on this post in the normal manner. This lid is then folded over the disc, and closed by means of cooperating latch elements present on the body and the lid, respectively. An annular ring projecting axially from the inner surface of the lid engages the upper surface of the disc when the lid is closed and prevents the disc from being jarred out of place while in the container.

More specifically, the invention provides a container for a disc of the type described herein where the base portion and the lid portion join to form the container body. The annular post projects axially inwardly from the inner surface of the body portion and the disc is seated in the container body by positioning the central aperture of the disc over the annular post and sliding the disc down the post into the base portion. The annular post not only directs the seating of the disc on the base, but also prohibits radial shifting or movement of the disc. An annular seat projects axially inwardly of the inner surface of the base in order to seat the disc above the inner surface of the base. The lid is positioned over the base, and is releasably connected to said base by cooperating latch elements. The annular ring projects axially inwardly from the inner surface of the lid and engages the disc at its inner mounting portion. This annular ring holds the disc in its seated position on the annular post, and prevents axial displacement of the disc from that position. Sidewalls are provided along the base portion to enclose the sides of the container.

An advantage of the container of the present invention is that it provides a container for a disc that may be produced at a low cost.

Another advantage of the container of the present invention is that it provides a container for a disc that is capable of securely housing a disc and protecting it from damage from external sources.

A further advantage of the container of the present invention is that it provides a container for a disc wherein the container body has a relatively flat outer surface whereby advertising or other printed material may be attached to said surface either directly or onto a medium such as a label, which is directly attached to the surface.

Yet another advantage of the container of the present invention is that it protects the disc from movement within the container by securing the disc in both radial and axial directions.

A still further advantage of the container of the present invention is that it provides a container for a disc that is highly durable and is capable of an extended lifetime.

The invention, provides, in one form thereof, a container for a disc of the type generally having a top surface that includes a radially outermost information storage portion and a radially innermost mounting portion, a bottom portion and an aperture formed substantially in the center of the disc and extending therethrough. The container body has a base portion and a lid portion, each having an inner surface and an outer surface. In a preferred embodiment, the base portion and the lid portion are substantially rectangular. The outer surfaces of the base and the lid are of substantially similar configuration, and these outer edges are in substantial alignment with each other when the container is in its closed condition. The base portion has sidewalls extending axially inwardly from its inner surface that engage the inner surface of the lid portion when the container is closed. A hinge mechanism is provided that connects the lid portion to the base portion, and a latch mechanism is provided that releasably maintains the container in its closed condition. A locating mechanism, such as an annular post, is provided in order to position the disc within the base portion. A retaining mechanism, such as an annular ring, is provided in the inner surface of the lid portion in order to hold down the disc on the locating mechanism when it is in the closed position.

These and other features and advantages of the present invention will become apparent to those skilled in the art upon a reading of the following detailed description when taken in conjunction with the drawings wherein there is shown and described an illustrative embodiment of the invention.

DETAILED DESCRIPTION OF THE PREFERRED EMBODIMENT

Figure 1:
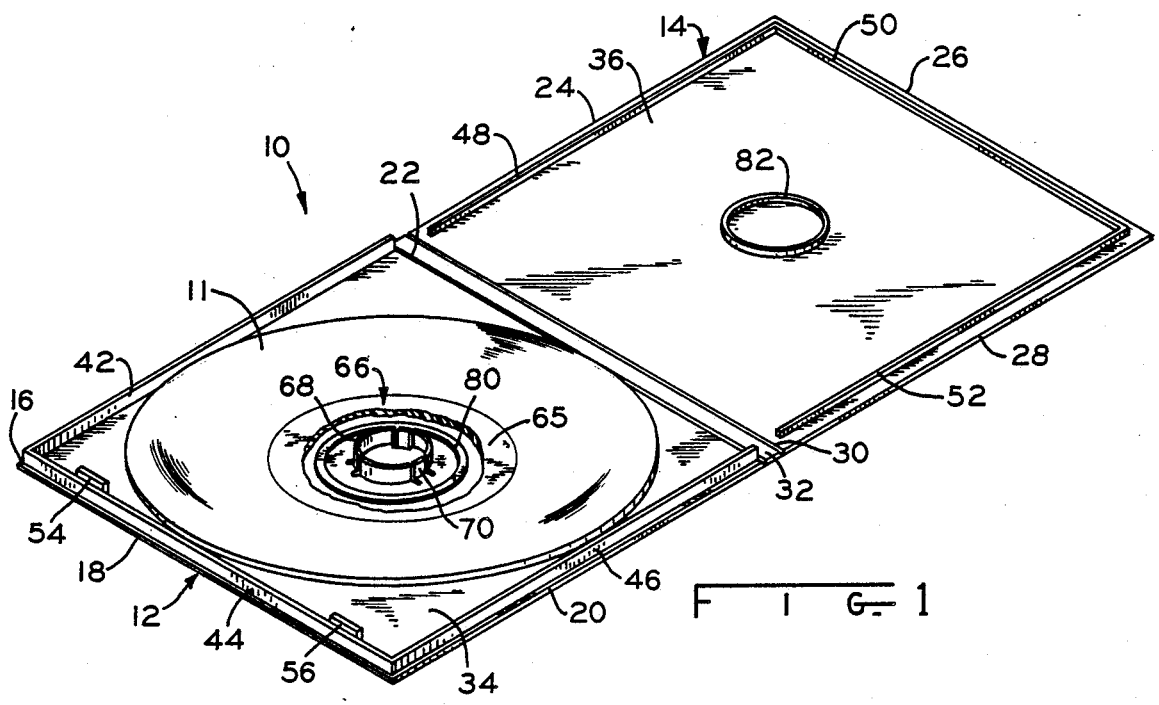
FIG. 1 is a perspective view of the container body in its open condition, showing a disc seated therein.
Figure 2:
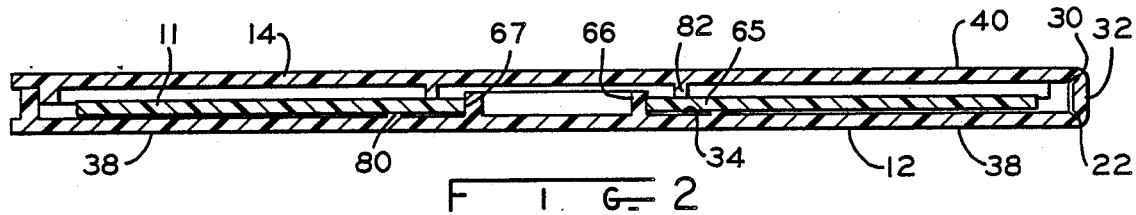
FIG. 2 is a sectional view taken through the container in its closed condition showing the disc seated therein.

A body 10 for a container for storing discs 11 is shown in an open condition in FIG. 1. Body 10 includes a base portion 12 and a lid portion 14, said portions being of substantially similar size and configuration. In the preferred embodiment illustrated in FIG. 1, base portion 12 and lid portion 14 are rectangular, wherein base portion 12 has side edges 16, 18, 20 and connecting edge 22, and lid portion 14 has side edges 24, 26, 28 and connecting edge 30. Connecting panel 32 bridges base portion 12 and lid portion 14, and is foldably attached to base portion 12 along connecting edge 22, and to lid portion 14 along connecting edge 30. The foldable connection operates in the manner of a hinge and is best shown in FIG. 2. Base portion 12 and lid portion 14 have inner surfaces 34, 36 (FIG. 1) and have outer surfaces 38, 40 (FIG. 2). Preferably these surfaces are flat. Sidewalls 42, 44, 46 are provided on inner surface 34 of base portion 12, and preferably extend adjacent side edges 16, 18, 20 respectively. Retaining walls 48, 50, 52 are provided on inner surface 36 of lid portion 14, and preferably extend adjacent side edges 24, 26, 28 respectively, as shown in FIG. 1. Retaining walls 48, 50, 52 are spaced from side edges 24, 26, 28 a somewhat greater distance than that by which sidewalls 42, 44, 46 are spaced from side edges 16, 18, 20 so that when the container is in the closed position as shown in FIG. 2, retaining walls 48, 50, 52 are positioned inwardly of sidewalls 42, 44, 46.

Figure 3:
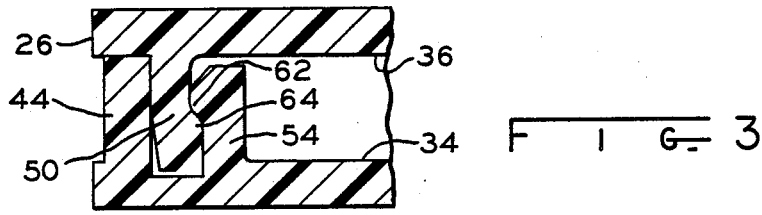
FIG. 3 is an enlarged, sectional view showing the cooperating latch elements.

Container body 10 is closed by folding lid portion 14 inwardly along connecting edges 22, 30 so that it is seated on body portion 12. This is best shown in FIG. 2. When body 10 is in its closed condition, inner surface 34 of base portion 12, and inner surface 36 of lid portion 14 are aligned with each other in face-to-face relationship. The container is maintained in its closed condition by cooperating latch elements provided on base portion 12 and lid portion 14. Latch tabs 54, 56 on base portion 12 are spaced from sidewall 44 and receive retaining wall 50. Each of latch tabs 54, 56 is positioned with respect to sidewall 44 so as to form a channel therebetween, as shown in FIGS. 1 and 3. Latch tabs 54, 56 have projections 62, and edge 50 has projection 64 that releasably engages when said body is in its closed condition (FIG. 3).

Base portion 12 has a post 66 that locates disc 11 in base portion 12. Disc 11 will ordinarily be comprised of an outer information storage portion, an inner mounting portion 65 and a central aperture 67 extending therethrough. Post 66 protrudes axially inwardly from the center area of inner surface 34. Post 66 in a preferred form comprises an annular post made up of a number of segments 68, 70 shown in FIG. 1. The diameter of annular post 66 is, preferably, approximately equal to but may be slightly less than or greater than the diameter of the central aperture in the disc 11. In one preferred embodiment, segments 68, 70 maintain a slight frictional, or "gripping" contact with disc 11. Annular post 66 similarly prevents radial displacement of disc 11 within base portion 12 as a result of the connection formed between annular post 66 and disc 11. Segments 68, 70 impart a resiliency to post 66 that aids in the placement of disc 11 in base 12, and this resiliency enhances the "gripping" of the disc by post 66. Although annular post 66 as described and illustrated in the drawings is comprised of numerous segments, a continuous post may be substituted for that shown in the drawings.

Figure 4:
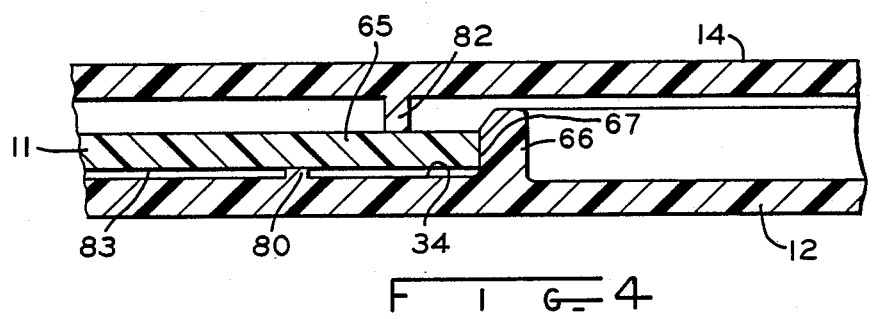
FIG. 4 is an enlarged, sectional view of the container body in its closed condition showing the disc being held in place by the annular ring.

Annular seat 80 protrudes axially inwardly from inner surface 34 of base portion 12. Annular seat 80 is concentric with and of greater diameter than annular post 66. As disc 11 is inserted in the container body and positioned on annular post 66, annular seat 80 provides an additional support for disc 11, and provides a resting position for the disc slightly above inner surface 34 of base portion 12. When placed in this resting position, inner mounting portion 65 of disc 11 is seated directly upon annular seat 80 (FIGS. 2, 4). This placement provides an additional cushion to protect the disc from damage, and also enables the user to easily lift the disc out of the container.

Inner surface 36 of lid portion 14 includes annular ring 82 protruding axially inwardly from said inner surface 36, and located substantially in the center of surface 36. Ring 82 has a greater diameter than annular post 66, but preferably of lesser diameter than annular seat 80. Ring 82 is of sufficient height so that when container body 10 is in the closed condition, as shown in FIGS. 2 and 4, it engages the surface of disc 11, preferably at inner mounting portion 65 of the disc. When ring 82 is of this height, disc 11 is firmly retained between annular seat 80 and ring 82 whereby axial movement and tilting of disc 11 in container body 10 is prevented, as best shown in FIG. 4. Preventing tilting of disc 11 on post 66 during shipment or transportation is important to avoid abrading or scratching of the surface 83 of disc 11 that carries the encoded musical information or data. The action of annular post 66, which prevents radial movement of disc 11 within container body 10, and the aforementioned protection against axial movement, combine to act in the nature of a clamp wherein both radial and axial movement of disc 11 within body 10 is prevented, as shown in FIGS. 2 and 4.

In a preferred embodiment, body 10 is formed from polypropylene. The use of polypropylene allows said body 10 to be molded at a low cost, and also provides for a semi-rigid body that provides protection for disc 11. Polypropylene has been found to be very durable, and has the ability to withstand the stress placed upon connecting edges 22, 30 as a result of the repetitive opening and closing of the container. Other suitable materials may be substituted for polypropylene, however, without departing from the scope of the invention.

The preferred shape of body 10 is rectangular, however, it will be appreciated that its usefulness is by no means restricted to this particular configuration. A round body, hexagonal body, and the like may be substituted. Outer surfaces 38, 40 of base portion 12 and lid portion 14, respectively, are preferably flat. This configuration provides an efficient use of shelf space, and perhaps more importantly, provides an effective surface area for the addition of labels or other advertising messages onto said surfaces.

It will be appreciated that the foregoing is presented by way of illustration only, and not by way of any limitation, that various alternatives and modifications may be made to the illustrated embodiment without departing from the spirit and scope of the invention.

What is claimed is:

1. A container for a disc of the type having a top surface including a radially outer information storage portion and a radially inner mounting portion, a bottom surface and an aperture substantially in the center thereof, said container comprising:

a body having a base portion and a lid portion, each of said portions having an inner surface and an outer surface;

said base portion further having a sidewall protruding axially inwardly and extending along a portion of the periphery of its inner surface;

said base portion and said lid portion being of substantially similar configuration and being in substantial alignment with each other when said container is in its closed position so that said inner surface of said base portion and said inner surface of said lid portion are facing each other;

hinge means for connecting said lid portion to said base portion;

cooperating latch means in said base portion and said lid portion for releasably locking said container in its closed condition, said cooperating latch means comprising latch tab means positioned on one of said base portion or lid portion inner surface, each of said latch tab means being spaced from a sidewall of said one of said base or lid portion to form a channel therebetween, said latch tab means having projections extending therefrom, said cooperating latch means further comprising engagement means associated with a retaining wall of the other of said lid portion or base portion inner surface for releasably engaging at least a portion of said retaining wall in said channel, said engagement means including respective projections adapted to engage respective projections of said latch tabs whereby said container is maintained in its closed condition; and clamp means for seating the disc in the container and protecting the disc from axial movement within said container, said clamp means comprising a protrusion on the inner surface of said lid portion.

2. The container of claim 1 in which said clamp means comprises locating means associated with the inner surface of said base portion for positioning the aperture of the disc thereon, and said protrusion is adapted to be in face to face abutment with a disc to hold down the disc on said locating means when the lid is in its closed condition.

3. The container of claim 2 in which said locating means comprises an annular post protruding axially inwardly from said inner surface of said base portion from an area located substantially in the center of said base portion inner surface.

4. The container of claim 3 in which said annular post has a diameter substantially equal to but slightly greater than the diameter of the aperture of the disc, so that when the disc is positioned in said base, a frictional engagement between the disc and said annular post is established.

5. The container of claim 3 in which said protrusion comprises an annular ring extending axially inwardly from said inner surface of said lid portion.

6. The container of claim 5 in which said annular ring is positioned substantially in the center of said inner surface of said lid portion wherein said annular ring is dimensioned to engage the mounting portion of the disc when the container is in its closed position, whereby axial movement of the disc in the container is prevented.

7. The container of claim 5 in which the diameter of said annular ring is greater than the diameter of said annular post, said annular post and said annular ring being substantially concentric when said container is in its closed condition.

8. The container of claim 1 in which said body is formed from a semi-rigid plastic material.

9. The container of claim 1 in which said body is formed from polypropylene.

10. The container of claim 1 in which said outer surface of said body portion and said outer surface of said lid portion are substantially flat whereby a label may be affixed thereon.

11. The container of claim 1 in which said base portion and said lid portion are substantially rectangular.

12. The container of claim 3 in which said base portion further includes an annular seat protruding axially inwardly from said base portion inner surface, said annular seat being of greater diameter than said annular post, whereby said annular seat supports the disc and prevents axial movement of the disc in the container.

13. The container of claim 12 in which said annular seat is of greater diameter than said annular ring.

14. A container for a disc of the type having a top surface with a radially outer information storage portion and a radially inner mounting portion, a bottom surface and a central aperture projecting therethrough, said container having an open position for insertion and removal of the disc and a closed position for storage of the disc comprising:

a rectangular base portion having an inner surface and an outer surface, said rectangular base further having side edges and a connecting edge;

a rectangular lid portion having an inner surface and an outer surface, said rectangular lid further having side edges and a connecting edge;

said base portion and said lid portion being of substantially similar configuration and being in substantial alignment with each other when said container is in the closed condition so that said inner surface of said base portion and said inner surface of said lid portion are facing each other;

a connecting panel having a first longitudinal side edge foldably connected to said connecting side edge of the base portion, and a second longitudinal side edge foldably connected to said connecting edge of the lid portion;

sidewalls protruding axially inwardly from said inner surface of said base portion and extending along the periphery of said base portion side edges;

cooperating latch means associated with said base portion and said lid portion for releasably engaging said container in its closed condition, said cooperating latch means comprising a pair of latch tabs positioned on said base portion inner surface and spaced from a sidewall of said base portion to form a channel therebetween, said latch tabs having radial projections extending therefrom, said cooperating latch means further comprising means associated with a retaining wall of said lid portion inner surface for releasably engaging at least a portion of said retaining wall in said channel, said means including respective radial projections adapted to engage respective radial projections of said latch tabs whereby said container is maintained in its closed condition;

locating means protruding axially inwardly from the inner surface of said base portion for mounting the disc thereon and preventing radial movement of the disc in the container; and retaining means protruding axially inwardly from the inner surface of said lid portion to hold down the disc on said locating means and prevent axial movement of the disc in the container.

15. The container of claim 14 in which said locating means comprises an annular post, said annular post having an outer diameter dimensioned so that when the disc is seated in said base portion, a frictional engagement between the disc and said annular post is established.

16. The container of claim 15 in which said retaining means comprises an annular ring dimensioned to engage the mounting portion of the disc when the container is in its closed condition, said annular ring being of greater diameter than said annular post and being substantially concentric with said post when said container is in the closed condition.

17. The container of claim 16 further comprising an annular seat protruding axially inwardly from the inner surface of said base portion, said annular seat being of greater diameter than said annular ring and being substantially concentric with said ring when said container is in its closed condition.

18. The container of claim 14 in which said outer surface of said body portion and said outer surface of said lid portion are substantially flat, whereby a label may be affixed thereon.

19. In combination, a disc of the type having a top surface including a radially outer information storage portion and a radially inner mounting portion, a bottom surface and an aperture substantially in the center thereof, and a container for said disc comprising a body having a base portion and a lid portion, each of said portions having an inner surface and an outer surface, said base portion further having a sidewall protruding axially inwardly and extending along a portion of the periphery of its inner surface, said base portion and said lid portion being of substantially similar configuration and being in substantial alignment with each other when said container is in its closed position so that said inner surface of said base portion and said inner surface of said lid portion are facing each other, hinge means for connecting said lid portion to said base portion, cooperating latch means in said base portion and said lid portion for releasably locking said container in its closed condition, said cooperating latch means comprising a pair of latch tabs positioned on said base portion inner surface and spaced from a sidewall of said base portion to form a channel therebetween, said latch tabs having radial projections extending therefrom, said cooperating latch means further comprising means associated with a retaining wall of said lid portion inner surface for releasably engaging at least a portion of said retaining wall in said channel, said means including respective radial projections adapted to engage respective radial projections of said latch tabs whereby said container is maintained in its closed condition, and clamp means for seating the disc in the container and protecting the disc from axial movement within said container, said clamp means comprising a protrusion on the inner surface of said lid portion.

20. The combination of claim 19, wherein said clamp means comprises locating means associated with the inner surface of said base portion for positioning the aperture of the disc thereon, and said protrusion is adapted to be in face to face abutment with a disc to hold down the disc on said locating means when the lid is in its closed condition.

21. The combination of claim 20 wherein said locating means comprises an annular post protruding axially inwardly from said inner surface of said base portion from an area located substantially in the center of said base portion inner surface, and said protrusion comprises an annular ring protruding axially inwardly from said inner surface of said lid portion, said annular ring having a greater diameter than said annular post, and said annular post and annular ring being substantially concentric when said container is in its closed condition.

* * * * *